(12) United States Patent
Yoon et al.

(10) Patent No.: US 6,185,170 B1
(45) Date of Patent: Feb. 6, 2001

(54) METHOD FOR TRACKING AN OPTICAL DISC OF A SHALLOW/DEEP GROOVE TYPE AND APPARATUS ADOPTING THE SAME

(75) Inventors: Du-Seop Yoon; Myoung-June Kim; Seung-Tae Chung; Byeung-Lyong Gill, all of Kyungki-do (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/178,486

(22) Filed: Oct. 26, 1998

(30) Foreign Application Priority Data

Oct. 24, 1997 (KR) .................................................. 97-54891

(51) Int. Cl.⁷ ...................................................... G11B 7/09
(52) U.S. Cl. ...................................... 369/44.29; 369/44.35
(58) Field of Search .............................. 369/44.13, 44.26,
369/44.27, 44.28, 44.29, 44.32, 44.34, 44.35,
47, 48, 54, 32, 275.4

(56) References Cited

U.S. PATENT DOCUMENTS 5,608,710 * 3/1997 Minemura et al. ................. 369/54 X
5,796,712 * 8/1998 Moribe et al. ..................... 369/275.4

FOREIGN PATENT DOCUMENTS 2-108244  4/1990  (JP) .

OTHER PUBLICATIONS

"Deep Groove Method on High Density Optical Disk Memory", Seiji Morita et al., Optomechatronics R&D Department and Information Storage Development Department, Nikon Corporation, pp. 92–93.

* cited by examiner

*Primary Examiner*—Muhammad Edun
(74) *Attorney, Agent, or Firm*—Staas & Halsey LLP

(57) ABSTRACT

A tracking method discriminates whether an optical disc loaded in a recording and/or reproduction system is a shallow groove type optical disc or a deep groove type optical disc, and corrects the phase of the tracking error signal detected from the optical disc according to the discrimination result, to then perform a tracking servo control using the corrected result. A tracking apparatus includes an optical signal detector detecting a tracking error signal from an optical disc loaded in a recording and/or reproduction system. A groove type discriminator analyzes the tracking error signal output from the optical signal detector to discriminate a groove type of the loaded optical disc and generates a corresponding control signal. A phase corrector corrects the phase of the tracking error signal output from the optical signal detector according to the control signal applied from the groove type discriminator. A tracking servo portion servo-controls a beam spot to perform an accurate tracking over a center line of a target track of the loaded optical disc, using the phase-corrected tracking error signal. The tracking method and apparatus enables accurate tracking-servo-controlling of both the shallow groove type optical disc and the deep groove type optical disc.

21 Claims, 3 Drawing Sheets

METHOD FOR TRACKING AN OPTICAL DISC OF A SHALLOW/DEEP GROOVE TYPE AND APPARATUS ADOPTING THE SAME

CROSS-REFERENCE TO RELATED APPLICATIONS

This application claims the benefit of Korean Application No. 97-54891, filed Oct. 24, 1997, in the Korean Patent Office, the disclosure of which is incorporated herein by reference.

BACKGROUND OF THE INVENTION

1. Field of the Invention

The present invention relates to a tracking method for use in recording data on and reproducing data from a high-density optical disc having lands and grooves and a tracking apparatus adopting the same, and more particularly, to a method for accurately tracking servo-controlling both a shallow groove type optical disc and a deep groove type optical disc which are loaded in a recording and/or reproducing system and an apparatus adopting the same.

2. Description of the Related Art

Recently, in the optical disc technical field, optical discs are being developed and vary from a low-density laser disc (LD) and compact disc (CD) to a high-density digital versatile disc (DVD). A currently developed DVD enlarges the numerical aperture (NA) of an objective lens in an optical pickup and uses a short wavelength laser, and thus largely enhances a recording density when compared with an existing CD. As an example, a digital versatile disc-random access memory (DVD-RAM) having a recording capacity of 2.6 GB was developed using a laser beam having a wavelength of 650 nm. Recently, a DVD-RAM of 4.7 GB has been developed by further narrowing a track pitch thereof and further shortening the length of a pit which is used for actually recording information.

Generally, an optical disc having a recordable and reproducible land/groove has a periodic arrangement of lands and grooves of the same pitch. Here, a recording and/or reproduction system records data on and reproduces the data from each land and groove of a loaded optical disc. FIG. 1 shows the structure of lands and grooves on a known shallow groove type optical disc. The shallow groove type optical disc is defined as an optical disc on the substrate of which grooves of $\lambda/8n$ through $\lambda/4n$ in depth are formed, in which $\lambda$ is a laser wavelength of an optical pickup and n is a refractive index of the substrate of the optical disc. As shown in FIG. 1, the optical disc has a track pitch 3 of 0.74 μm defined as a width ranging from the center of a land 1 to that of a groove 2 and a groove depth 4 of $\lambda/6.5n$ where laser incident light 5 having a wavelength ($\lambda$) of 650 nm is used for the optical disc.

Meanwhile, FIG. 2 shows the structure of lands and grooves on a known deep groove type optical disc for enhancing a recording density in comparison with the shallow groove type optical disc shown in FIG. 1. The deep groove type optical disc is defined as an optical disc on the substrate of which grooves of $\lambda/4n$ through $\lambda/2n$ in depth are formed, in which $\lambda$ is a laser wavelength of an optical pickup and n is a refractive index of the substrate of the optical disc. As shown in FIG. 2, the optical disc has a shorter track pitch 13 of 0.58 μm (the width from the center of a land 11 to that of a groove 12) and a shorter pit than those of FIG. 1 in which laser incident light 5 of 630 nm, shorter than that of FIG. 1, is used for the optical disc. In this case, cross-talk increases due to interference from signals recorded on neighboring tracks during reproduction of data, and more influences are given to neighboring tracks during recording and erasing data. To solve these problems, the optical disc of FIG. 2 has a groove depth 14 of $\lambda/3n$ deeper than that of FIG. 1 to thereby minimize the effects due to the signal interference from the neighboring tracks.

Meanwhile, a tracking error signal (TES) should be obtained from an optical disc, in order to servo-control an optical pickup so that the beam spot from the optical pickup performs an exact tracking over the center line of a target track on the optical disc, during recording and reproducing data. In a push-pull method chiefly adopted for this purpose, two-division-photodiodes (2D–PD) or four-division-photodiodes (4D–PD) which are arranged symmetrically left and right with respect to the center line of a track detect the strength of the light reflected and diffracted from the optical disc, and a left-right light strength difference of signals detected with respect to the center line of the track is obtained as a tracking error signal. The tracking error signal of the push-pull method is called a push pull signal (PPS). A tracking servo portion complementarily drives an actuator for driving an objective lens or a rough-movement motor for driving the entire optical pickup portion, using the obtained tracking error signal, to thereby servo-control the optical pickup so that the beam spot of the optical pickup performs an accurate tracking over the center line of the target track.

However, the tracking error signal detected from the above-described deep groove type optical disc is reversed in phase (polarity) in comparison with that detected from the shallow groove type optical disc. As a result, when a recording and/or reproduction system for the shallow groove type optical disc performs a tracking servo control over the deep groove type optical disc, an error occurs in the tracking error signal. Thus, an accurate tracking servo control cannot be performed.

SUMMARY OF THE INVENTION

To solve the above problems, it is an object of the present invention to provide a tracking method for performing accurate tracking servo control over both a shallow groove type optical disc and a deep groove type optical disc.

It is another object of the present invention to provide a tracking apparatus for embodying the above-described tracking method.

Additional objects and advantages of the invention will be set forth in part in the description which follows and, in part, will be obvious from the description, or may be learned by practice of the invention.

To accomplish the first and other objects of the present invention, there is provided a tracking method for tracking an optical disc loaded in a recording and/or reproduction system for both a shallow groove type optical disc and a deep groove type optical disc, the tracking method including the steps of (a) analyzing a tracking error signal detected from the loaded optical disc, to then discriminate whether the optical disc is a shallow groove type or a deep groove type; (b) inverting a phase of the detected tracking error signal when the loaded optical disc is the deep groove type as a result of the discrimination, while not inverting a phase of the tracking error signal when the loaded optical disc is a shallow groove type; and (c) servo-controlling a beam spot to perform an accurate tracking over a center line of a target track of the loaded optical disc, using the tracking error signal obtained in the step (b).

The first and other objects of the present invention may also be achieved by providing a tracking method for tracking an optical disc loaded in a recording and/or reproduction system for both a shallow groove type optical disc and a deep groove type optical disc, the tracking method including the steps of (a) detecting a tracking error signal and a radio-frequency signal from the loaded optical disc; (b) extracting groove type identification information recorded previously in a header region of the loaded optical disc from the detected radio-frequency signal, to then discriminate whether the loaded optical disc is the shallow groove type optical disc or the deep groove type optical disc on the basis of the extracted groove type identification information; (c) inverting a phase of the detected tracking error signal when the loaded optical disc is the deep groove type as a result of the discrimination, while not inverting the phase of the tracking error signal when the loaded optical disc is the shallow groove type; and (d) servo-controlling a beam spot to perform an accurate tracking over the center line of a target track of the loaded optical disc, using the tracking error signal obtained in the step (c).

To accomplish the second and other objects of the present invention, there is provided a tracking apparatus for tracking an optical disc loaded in a recording and/or reproduction system for both a shallow groove type optical disc and a deep groove type optical disc, the tracking apparatus including an optical signal detector detecting a tracking error signal from the loaded optical disc; a groove type discriminator analyzing the tracking error signal detected from the optical signal detector, discriminating whether the loaded optical disc is the shallow groove type optical disc or the deep groove type optical disc, and generating a control signal in correspondence to the discrimination result; a phase corrector correcting the phase of the tracking error signal detected from the optical signal detector according to the control signal from the groove type discriminator; and a tracking servo portion servo-controlling a beam spot to perform an accurate tracking over a center line of a target track of the loaded optical disc, using the tracking error signal obtained from the phase corrector.

To also accomplish the second and other objects of the present invention, there may be provided a tracking apparatus for tracking an optical disc loaded in a recording and/or reproduction system for both a shallow groove type optical disc and a deep groove type optical disc, the tracking apparatus including an optical signal detector detecting a tracking error signal and a radio-frequency signal from the loaded optical disc; a groove type discriminator extracting groove type identification information recorded previously in a header region of the optical disc from the detected radio-frequency signal by the optical signal detector, to then discriminate whether the loaded optical disc is the shallow groove type optical disc or the deep groove type optical disc, and generating a control signal in correspondence to the discrimination result; a phase corrector inverting the phase of the tracking error signal output from the optical signal detector when the control signal of the deep groove type is applied, while not inverting the phase of the tracking error signal output from the optical signal detector when the control signal of the shallow groove type is applied from the groove type discriminator; and a tracking servo portion servo-controlling a beam spot to perform an accurate tracking over a center line of a target track of the loaded optical disc, using the tracking error signal obtained from the phase corrector.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now made in detail to the present preferred embodiments of the present invention, examples of which are illustrated in the accompanying drawings. The embodiments are described below in order to explain the present invention by referring to the figures.

Figure 1:
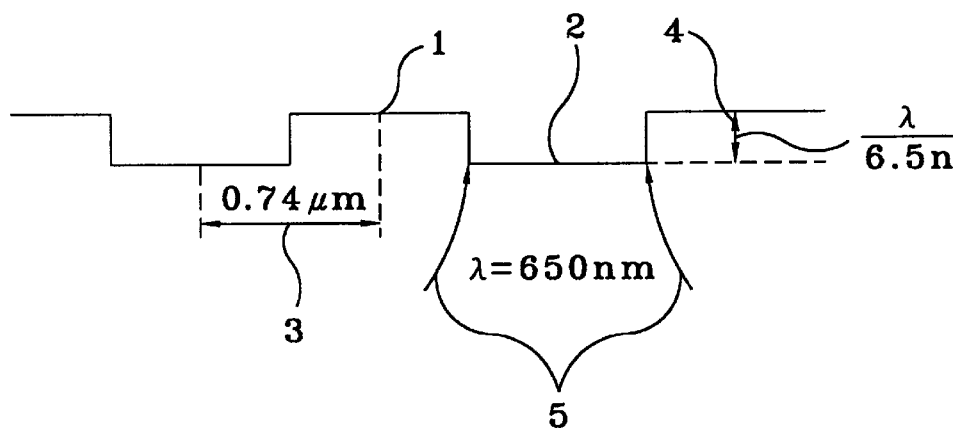
FIG. 1 shows a cross-sectional view of a known shallow groove type optical disc having lands and grooves for recording and reproduction.
Figure 2:
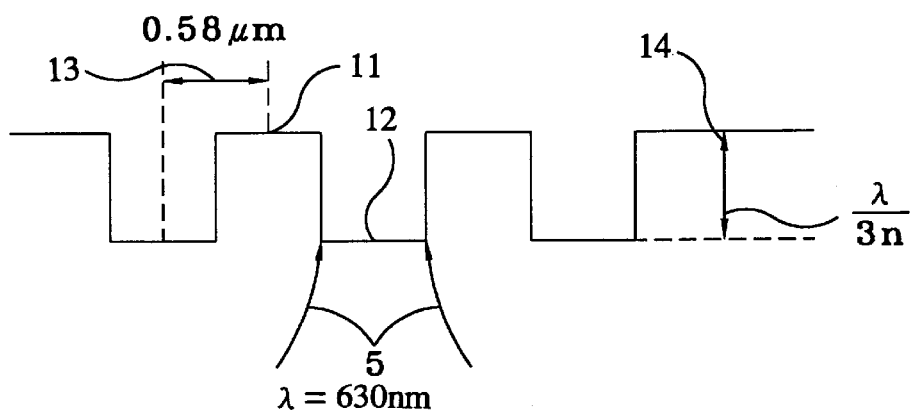
FIG. 2 shows a cross-sectional view of a known deep groove type optical disc having lands and grooves for recording and reproduction.
Figure 3:
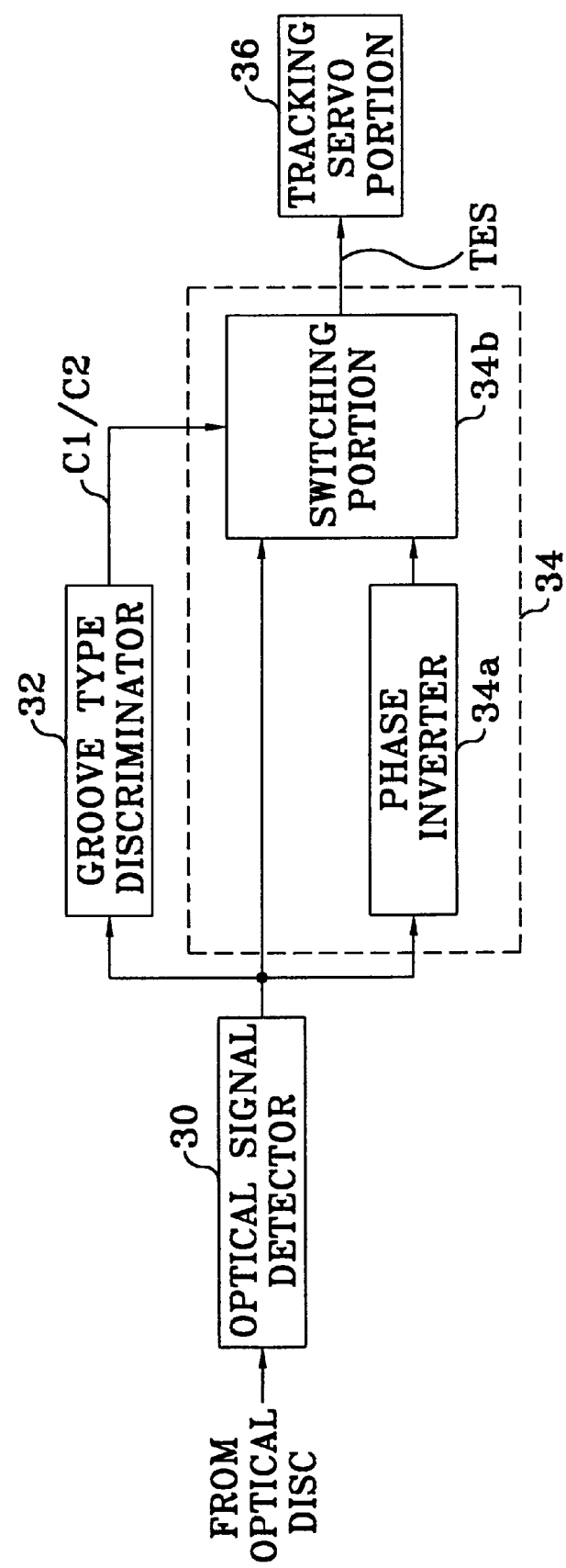
FIG. 3 is a block diagram showing the structure of a tracking apparatus for both a shallow groove type optical disc and a deep groove type optical disc according to a first embodiment of the present invention.

FIG. 3 is a block diagram showing a tracking apparatus according to a first embodiment of the present invention. An optical signal detector 30 detects a tracking error signal from an optical disc loaded in a recording and/or reproduction system, on the basis of a push-pull method. A groove type discriminator 32 analyzes the tracking error signal output from the optical signal detector 30, discriminates whether the currently loaded disc is a shallow groove type or a deep groove type, and generates a control signal C1 or C2 in correspondence to the discrimination result. A phase correction portion 34 either does not invert the phase of the tracking error signal output from the optical signal detector 30 or inverts the same, according to the control signal from the groove type discriminator 32. Accordingly, the phase correction portion 34 corrects the phase of the detected tracking error signal and outputs the corrected result to a tracking servo portion 36. In this embodiment, the phase correction portion 34 includes a phase inverter 34a and a switching portion 34b. The phase inverter 34a inverts the phase of the tracking error signal output from the optical signal detector 30 and outputs the inverted result to the switching portion 34b. The switching portion 34b selects the tracking error signal output from the optical signal detector 30 if the control signal C1 of a shallow groove type optical disc is applied from the groove type discriminator 32, and selects the tracking error signal which has been phase-inverted in the phase inverter 34a if the control signal C2 of a deep groove type optical disc is applied therefrom, and then outputs the selected one to the tracking servo portion 36. The tracking servo portion 36 servo-controls a beam spot to perform an accurate tracking over a center line of a target track of the loaded optical disc, using the tracking error signal which has been phase-corrected in the phase correction portion 34.

Figure 4:
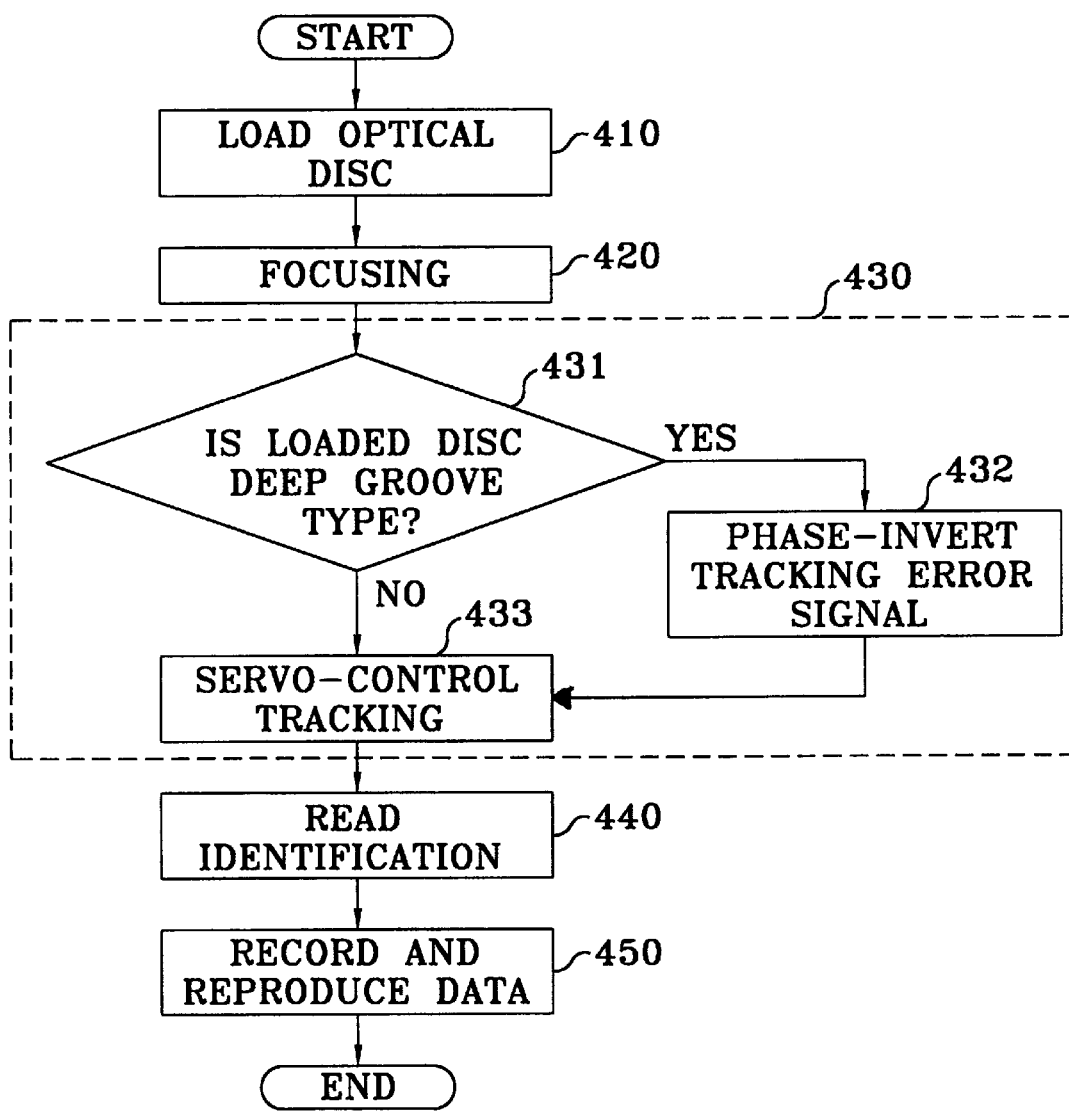
FIG. 4 is a flowchart diagram illustrating a tracking method for both a shallow groove type optical disc and a deep groove type optical disc according to the first embodiment of the present invention.

The operation of the tracking apparatus shown in FIG. 3 will be described below with reference to the flowchart diagram shown in FIG. 4.

If an optical disc is loaded into a recording and/or reproduction system (not shown) including a tracking apparatus shown in FIG. 3 (step 410), an optical pickup (not shown) in the system moves to the initial position of the loaded optical disc, and then a focusing is performed so that a beam spot is accurately formed on the recording surface of the optical disc (step 420). If the focusing is completed, the system moves the beam spot of the optical pickup to a header region on which a sync signal and sector address information and so on are recorded.

Then, the tracking apparatus of FIG. 3 according to the first embodiment of the present invention discriminates whether the optical disc having lands and grooves for recording and reproduction and which is currently loaded into the system is a shallow groove type optical disc or a deep groove type optical disc (step 431). In more detail, if a beam spot formed by the laser light emission of the optical pickup is diffracted and reflected from the header region on the optical disc, the optical signal detector 30 of FIG. 3 detects a tracking error signal. The groove type discriminator 32 analyzes the tracking error signal output from the optical signal detector 30 and discriminates the groove type of the loaded optical disc. As a result of the discrimination, the groove type discriminator 32 generates the first control signal C1 if the loaded optical disc is a shallow groove type, and the second control signal C2 if the loaded optical disc is a deep groove type. Here, the groove type discriminator 32 determines that the loaded optical disc is a shallow groove type optical disc if the phase of the tracking error signal detected from the currently loaded optical disc has not been inverted, and determines that the loaded optical disc is a deep groove type optical disc if inverted, in comparison with the phase of a predetermined reference signal corresponding to the tracking error signal of the shallow groove type optical disc. In this case, it is preferable that the tracking error signal for discriminating the groove type of the optical disc is detected from the header region of the optical disc, but the present invention is not limited thereto.

Meanwhile, the switching portion 34b of FIG. 3 selects the tracking error signal having a non-inverted phase output from the optical signal detector 30 and outputs the selected result to the tracking servo portion 36, if the first control signal C1 is applied from the groove type discriminator 32, and selects the tracking error signal having an inverted phase output from the phase inverter 34a and outputs the selected result to the tracking servo portion 36 if the second control signal C2 is applied from the groove type discriminator 32 (step 432). The tracking servo portion 36 servo-controls a beam spot to perform an accurate tracking over the center line of a target track of the loaded optical disc, using the tracking error signal supplied from the switching portion 34b (step 433). The above-described steps 431 through 433 correspond to the tracking method of the optical disc according to the embodiment of the present invention.

If the beam spot generated from the optical pickup performs an accurate tracking over the center line of the target track, a recording and/or reproduction system moves the optical pickup in order to read out identification data (ID) representing the start of each sector (step 440). Then, the above-described system moves the optical pickup to a target sector of a data region on the basis of the read ID in order to record data thereon or reproduce the same therefrom (step 450).

Meanwhile, an alternative method for discriminating the groove type of an optical disc loaded into a recording and/or reproduction system according to a second embodiment of the present invention, records groove type identification information indicating a shallow groove type or a deep groove type in advance into a header region on an optical disc, and discriminates whether the loaded optical disc is a shallow groove type optical disc or a deep groove type optical disc based on the read groove type identification information.

Another tracking apparatus (not shown) according to the second embodiment of the present invention can be embodied by substituting the optical signal detector 30 and the groove type discriminator 32 among the respective components shown in FIG. 3 with a modified optical signal detector and a modified groove type discriminator for implementing the above-described alternative groove type discrimination method. Briefly, the modified optical signal detector detects a tracking error signal from a loaded optical disc and at the same time reproduces a radio frequency (RF) signal therefrom. For example, when four-division photodiodes are employed in the optical signal detector, the RF signal is obtained by adding all the detected signals from each divided photodiode, and corresponds to actual data recorded on the optical disc. The RF signal is supplied to the modified groove type discriminator via a predetermined signal processing unit. The modified groove type discriminator which can employ an unshown system controller or a servo controller discriminates the groove type identification information previously recorded among the RF playback signals read from the header region on the optical disc, to thereby determine the groove type of the optical disc. Also, the groove type discriminator applies the control signal C1 or C2 in correspondence to the discrimination result to the phase inverter 34 shown in the apparatus of FIG. 3. Since the structures and functions of the phase inverter 34 and the tracking servo portion 36 are same as those of the apparatus of FIG. 3, the detailed description thereof will be omitted. Further, since it is apparent to a person who has ordinary skill in the art that the above-described modified structures and functions can originate from the apparatus of FIG. 3 with the technical concept of the present invention and the above description, the drawings thereof will be omitted.

As described above, the tracking method and apparatus of the optical disc according to the present invention discriminates the groove type of the optical disc loaded in the recording and/or reproduction system, and uses a tracking error signal which is phase-corrected based on the discrimination result, to thereby provide an effect capable of accurately tracking-servo-controlling both a shallow groove type optical disc and a deep groove type optical disc.

While certain embodiments of the invention have been specifically described herein, it will be apparent that numerous modifications may be made thereto without departing from the spirit and scope of the invention.

What is claimed is:

1. A tracking method for tracking an optical disc loaded in a recording and/or reproduction system for both a first depth groove type optical disc and a second depth groove type optical disc, wherein the second depth is deeper than the first depth, the tracking method comprising the steps of:
   (a) analyzing a tracking error signal detected from the loaded optical disc, to discriminate whether the loaded optical disc is the first depth groove type optical disc or the second depth groove type optical disc;
   (b) inverting a phase of the detected tracking error signal if the loaded optical disc is discriminated as one of the first depth groove type optical disc and the second depth groove type optical disc, and not inverting the phase of the detected tracking error signal if the loaded optical disc is discriminated as the other one of the first depth groove type optical disc and the second depth groove type optical disc; and
   (c) servo-controlling a beam spot to perform a tracking over a center line of a target track of the loaded optical disc, using the tracking error signal obtained in said step (b).

2. The tracking method according to claim 1, wherein said step (a) comprises the step of detecting the tracking error signal from the header region of the loaded optical disc to discriminate the groove type of the loaded optical disc.

3. The tracking method according to claim 1, wherein:
said step (a) comprises the step of discriminating that the loaded optical disc is the first depth groove type optical disc if the phase of the detected tracking error signal has not been inverted in comparison with a phase of a predetermined reference signal corresponding to the tracking error signal of the first depth groove type optical disc, and discriminating that the loaded optical disc is the second depth groove type optical disc if the phase of the detected tracking error signal has been inverted in comparison with the phase of the predetermined reference signal corresponding to the tracking error signal of the first depth groove type optical disc;
said step (b) comprises the step of inverting the phase of the detected tracking error signal if the loaded optical disc is discriminated as the second depth groove type optical disc, and not inverting the phase of the detected tracking error signal if the loaded optical disc is discriminated as the first depth groove type; and
the first depth groove type optical disc is defined as having a substrate in which grooves of $\lambda/8n$ through $\lambda/4n$ in depth are formed and the second depth groove type optical disc is defined as having a substrate in which grooves of $\lambda/4n$ through $\lambda/2n$ in depth are formed, in which $\lambda$ is a laser wavelength of an optical pickup and n is a refractive index of the substrate of the corresponding optical disc.

4. The tracking method according to claim 3, wherein each of the first and second depth groove type optical discs has lands and grooves, wherein a first distance from a center of one of the lands of the first depth groove type optical disc to a center of an adjacent groove is approximately 0.74 $\mu$m, and a second distance from a center of one of the lands of the second depth groove type optical disc to a center of an adjacent groove is approximately 0.58 $\mu$m.

5. The tracking method according to claim 1, wherein said step (b) comprises the step of inverting the phase of the detected tracking error signal if the loaded optical disc is discriminated as the second depth groove type optical disc, and not inverting the phase of the detected tracking error signal if the loaded optical disc is discriminated as the first depth groove type.

6. The tracking method according to claim 1, further comprising the step of detecting the tracking error signal using a push-pull method prior to said step (a).

7. The tracking method according to claim 1, further comprising the step of detecting the tracking error signal from a header region of the loaded optical disc prior to said step (a).

8. The tracking method as claimed in claim 1, further comprising the steps of:
focusing the beam spot on a recording surface of the loaded optical disc prior to said step (a);
reading out identification data representing a start of each sector of the loaded optical disc subsequent to said step (c); and
moving an optical pickup to a target sector of a data region based upon the read identification data, to record data on or reproduce the data from the loaded optical disc.

9. The tracking method according to claim 1, wherein said step (c) comprises the step of inverting the phase of the detected tracking error signal if the loaded optical disc is discriminated as the second depth groove type optical disc, and not inverting the phase of the detected tracking error signal if the loaded optical disc is discriminated as the first depth groove type.

10. A tracking method for tracking an optical disc loaded in a recording and/or reproduction system for both a first depth groove type optical disc and a second depth groove type optical disc, wherein the second depth is deeper than the first depth, the tracking method comprising the steps of:
(a) detecting a tracking error signal and a radio-frequency signal from the loaded optical disc;
(b) extracting groove type identification information recorded previously in a header region of the loaded optical disc from the detected radio-frequency signal, to discriminate whether the loaded optical disc is the first depth groove type optical disc or the second depth groove type optical disc based upon the extracted groove type identification information;
(c) inverting the phase of the detected tracking error signal if the loaded optical disc is discriminated as one of the first depth groove type optical disc and the second depth groove type optical disk, and not inverting the phase of the detected tracking error signal if the loaded optical disc is discriminated as the other one of the first depth groove type optical disc and the second groove type optical disc; and
(d) servo-controlling a beam spot to perform a tracking over a center line of a target track of the loaded optical disc, using the detected tracking error signal obtained in said step (c).

11. The tracking apparatus according to claim 10, wherein said phase corrector inverts the detected tracking error signal if the loaded optical disc is discriminated as the second depth groove type optical disc, and does not invert the phase of the detected tracking error signal if the loaded optical disc is discriminated as the first depth groove type.

12. The tracking method as claimed in claim 10, further comprising the steps of:
focusing the beam spot on a recording surface of the loaded optical disc prior to said step (a);
reading out identification data representing a start of each sector of the loaded optical disc subsequent to said step (d); and
moving an optical pickup to a target sector of a data region based upon the read identification data, to record data on or reproduce the data from the loaded optical disc.

13. A tracking apparatus for tracking an optical disc loaded in a recording and/or reproduction system for both a first depth groove type optical disc and a second depth groove type optical disc, wherein the second depth is deeper than the first depth, the tracking apparatus comprising:
an optical signal detector detecting a tracking error signal from the loaded optical disc;
a groove type discriminator analyzing the tracking error signal detected from said optical signal detector, discriminating whether the loaded optical disc is the first depth groove type optical disc or the second depth groove type optical disc, and generating a control signal corresponding to the discrimination;
a phase corrector correcting the phase of the tracking error signal detected from the optical signal detector according to the control signal from the groove type discriminator; and
a tracking servo portion servo-controlling a beam spot to perform a tracking over a center line of a target track of the loaded optical disc, using the phase corrected tracking error signal obtained from said phase corrector.

14. The tracking apparatus according to claim 13, wherein:
   said optical signal detector detects the tracking error signal from a header region of the loaded optical disc; and
   said groove type discriminator analyzes the tracking error signal detected from the header region of the loaded optical disc to discriminate the groove type of the loaded optical disc.

15. The tracking apparatus according to claim 13, wherein:
   said groove type discriminator discriminates that the loaded optical disc is the first depth groove type optical disc if a phase of the detected tracking error signal has not been inverted in comparison with a phase of a predetermined reference signal corresponding to the tracking error signal of the first depth groove type optical disc, and discriminates that the loaded optical disc is the second depth groove type optical disc if the phase of the detected tracking error signal has been inverted in comparison with the phase of the predetermined reference signal corresponding to the tracking error signal of the first depth groove type optical disc; and
   the first depth groove type optical disc is defined as having a substrate in which grooves of $\lambda/8n$ through $\lambda/4n$ in depth are formed and the second depth groove type optical disc is defined as having a substrate in which grooves of $\lambda/4n$ through $\lambda/2n$ in depth are formed, in which $\lambda$ is the laser wavelength of an optical pickup and n is a refractive index of the substrate of the corresponding optical disc.

16. The tracking apparatus as claimed in claim 15, wherein each of the first and second depth groove type optical discs has lands and grooves, wherein a first distance from a center of one of the lands of the first depth groove type optical disc to a center of an adjacent groove is approximately 0.74 μm, and a second distance from a center of one of the lands of the second depth groove type optical disc to a center of an adjacent groove is approximately 0.58 μm.

17. The tracking apparatus according to claim 13, wherein said phase corrector comprises:
   a phase inverter inverting a phase of the tracking error signal detected by said optical signal detector; and
   a switching portion selecting the tracking error signal detected by said optical signal detector if the control signal from said groove type discriminator is indicative of the first depth groove type optical disc, and selecting the phase inverted tracking error signal from said phase inverter if the control signal from said groove type discriminator is indicative of the second depth groove type, and outputting the selected one of the tracking error signal and the phase inverted tracking error signal as the phase corrected tracking error signal to the tracking servo portion.

18. A tracking apparatus for tracking an optical disc loaded in a recording and/or reproduction system for both a first depth groove type optical disc and a second depth groove type optical disc, wherein the second depth is deeper than the first depth, the tracking apparatus comprising:
   an optical signal detector detecting a tracking error signal and a radio-frequency signal from the loaded optical disc;
   a groove type discriminator extracting groove type identification information recorded previously in a header region of the optical disc from the detected radio-frequency signal by said optical signal detector, to discriminate whether the loaded optical disc is the first depth groove type optical disc or the second depth groove type optical disc, and generating a control signal corresponding to the discrimination result;
   a phase corrector inverting a phase of the tracking error signal output from the optical signal detector if the control signal is indicative of one of the first depth groove type optical disc and the groove type optical disc, and not inverting the phase of the tracking error signal output from the optical signal detector if the control signal is indicative of the other one of the first depth groove type optical disc and the second depth groove type optical disc, to generate a phase corrected tracking error signal; and
   a tracking servo portion servo-controlling a beam spot to perform a tracking over a center line of a target track of the loaded optical disc, using the phase corrected tracking error signal.

19. A tracking method for tracking an optical disc loaded in a recording and/or reproduction system for both a first depth groove type optical disc and a second depth groove type optical disc, wherein the second depth is deeper than the first depth, the tracking method comprising the steps of:
   (a) analyzing a tracking error signal detected from the loaded optical disc, to discriminate whether the optical disc is the first depth groove type optical disc or the second depth groove type optical disc;
   (b) inverting a phase of the detected tracking error signal based upon the discrimination of the loaded optical disc in said step (a), to output a phase sensitive tracking error signal; and
   (c) servo-controlling a beam spot to perform a tracking over a center line of a target track of the loaded optical disc, using the phase sensitive tracking error signal output in said step (b).

20. A tracking apparatus for tracking an optical disc loaded in a recording and/or reproduction system for both a first depth groove type optical disc and a second depth groove type optical disc, wherein the second depth is deeper than the first depth, the tracking apparatus comprising:
   an optical signal detector detecting a tracking error signal from the loaded optical disc;
   a groove type discriminator analyzing the tracking error signal detected from said optical signal detector, discriminating whether the loaded optical disc is the first depth groove type optical disc or the second depth groove type optical disc, and generating a control signal corresponding to the discrimination;
   a phase corrector inverting a phase of the detected tracking error signal based upon the discrimination of the loaded optical disc, to output a phase sensitive tracking error signal; and
   a tracking servo portion servo-controlling a beam spot to perform a tracking over a center line of a target track of the loaded optical disc, using the phase sensitive tracking error signal.

21. A tracking method for tracking an optical disc loaded in a recording and/or reproduction system for both a first depth groove type optical disc and a second depth groove type optical disc, wherein the second depth is deeper than the first depth, the tracking method comprising the steps of:
   (a) analyzing a tracking error signal detected from the loaded optical disc, to discriminate whether the optical disc is the first depth groove type optical disc or the second depth groove type optical disc;

(b) adjusting a phase of the detected tracking error signal based upon the discrimination of the loaded optical disc, to match the phase of the detected tracking error signal with a phase of associated with one of the first and second groove depth type optical discs, to output a phase sensitive tracking error signal; and (c) servo-controlling a beam spot to perform a tracking over a center line of a target track of the loaded optical disc, using the phase sensitive tracking error signal output in said step (b).

* * * * *